(No Model.)
J. J. BERRIGAN.
PROCESS OF SEPARATING CREAM FROM MILK.
No. 463,731. Patented Nov. 24, 1891.
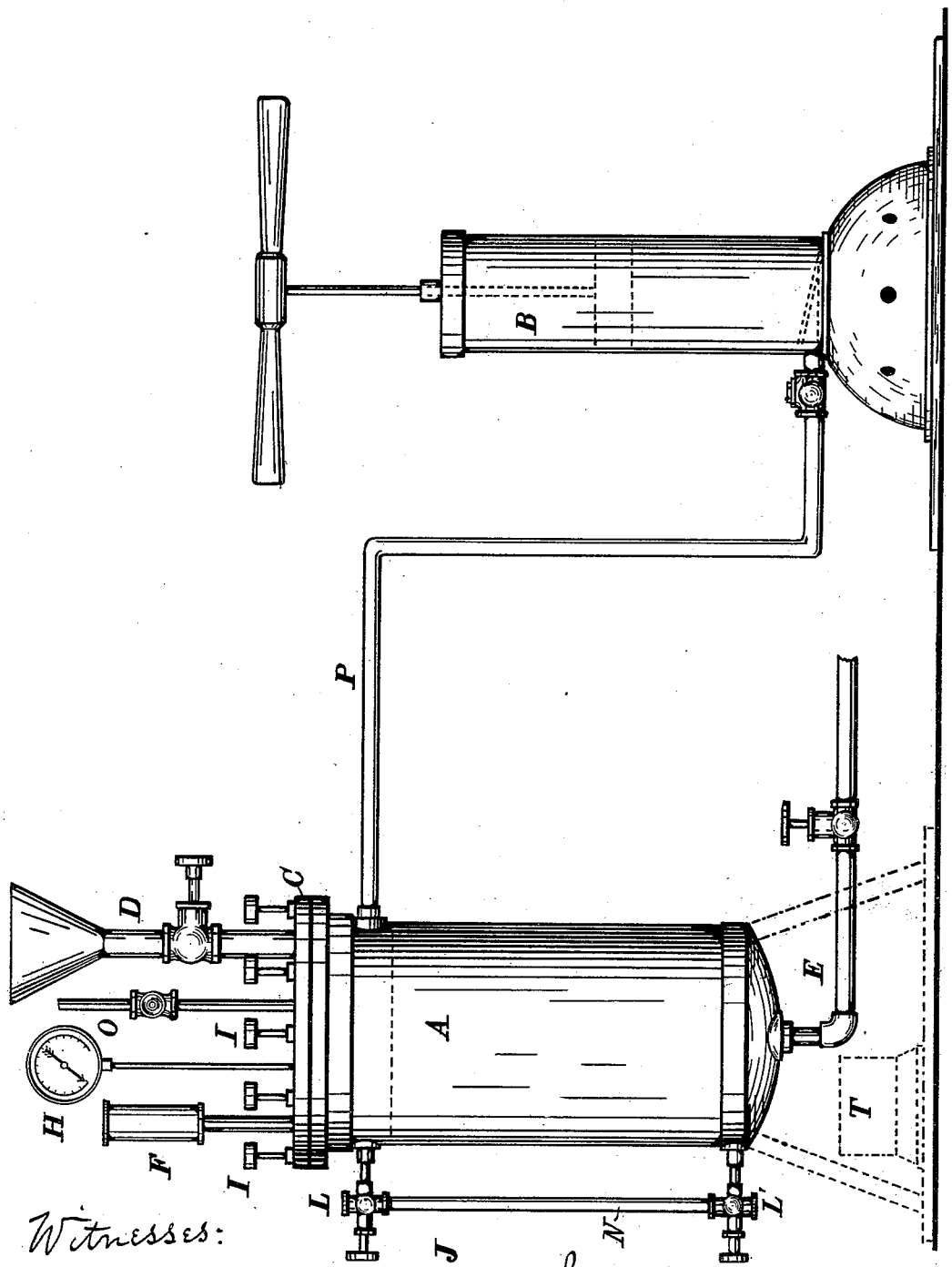

UNITED STATES PATENT OFFICE.

JOHN J. BERRIGAN, OF AVON, NEW YORK.

PROCESS OF SEPARATING CREAM FROM MILK.

SPECIFICATION forming part of Letters Patent No. 463,731, dated November 24, 1891.

Application filed April 6, 1891. Serial No. 387,810. (No model.)

*To all whom it may concern:*

Be it known that I, JOHN J. BERRIGAN, a citizen of the United States, residing at Avon, in the county of Livingston and State of New York, have invented an Improved Process of Separating Cream from Milk, of which the following is a specification, reference being had to the accompanying drawing.

My invention relates to an improved process of separating cream from milk by the employment of air or gaseous pressure upon the milk for a limited period of time and by then reducing the same for the purpose of facilitating the rising of the cream.

The manner of operating my improved process is fully described and illustrated in the following specification and the accompanying drawing and the novel features thereof specified in the claims annexed to the said specification.

In the accompanying drawing I have represented apparatus adapted to carrying out my improved process of separating cream from milk.

A is a suitable receptacle for the milk from which it is desired to remove the cream, and B any suitable air-pump or compression apparatus adapted to produce gaseous pressure upon the milk. The receptacle A is made of any suitable size, and it may be arranged with its longest dimensions either horizontal or vertical. It is preferably provided with a removable lid or cover C, through which access may be had to the interior for inspection or cleaning. It is also provided with suitable pipes, through which the milk is introduced and the milk and cream are discharged from the receptacle. Such pipes are represented at D and E, both of them being provided with suitable valves.

F is a blow-off valve, and H a pressure-gage. The cover C is secured in place on the receptacle by the bolts or screws I, suitable packing being interposed. At J, on the side of the receptacle, is shown a glass gage, which if used enables the operator to observe the amount of milk in the receptacle and the cream as it rises or is separated from the milk.

L L' are removable caps or plugs on the fittings of the gage-glass arranged in line with the axis of the glass tube N, so that the latter can be cleaned out by passing a swab or other suitable instrument through it. Provision is made for relieving the gaseous pressure in the receptacle by the valve in the pipe D or through a separate pipe O, provided with a suitable valve.

P is a pipe connecting the body of the compression-pump with the upper part of the receptacle. The pump is of any ordinary or preferred construction, provided with suitable inlet and outlet valves, and arranged to be operated by hand or power. Any other suitable means of applying pressure may, however, be employed.

In the practical operation of my improved process of separating cream the milk is placed at a suitable temperature in the closed receptacle A, the pump is worked, and a gaseous pressure produced thereby on the milk in the receptacle during a certain period of time— say from one to five or ten minutes—and then upon the pressure being released by opening a suitable valve the cream rises quickly and completely within a short time, and it is then removed in any suitable or preferred manner. I usually run the milk out first by opening the valve in the pipe E and then run the cream out into another vessel through the same valve. It may, however, be removed from the top or discharged through a valve in the side of the receptacle.

The temperature of the milk during the process may vary within ordinary limits; but I prefer to operate at a temperature of 70° to 75°. The amount of pressure employed may vary from a few pounds to one hundred pounds or more on the square inch. I usually employ a pressure of from about fifteen to eighty pounds and keep it on from one to five minutes. I have obtained very satisfactory results with a pressure of three atmospheres—forty-five pounds—kept on for about three minutes, the cream being all up in about twenty-five minutes. The lower pressures require increased time to secure the best results. The cream rises freely shortly after the pressure is released, and the process continues until in a short time the cream is entirely separated from the milk. The progress of the operation can be observed through the glass tube N, which also enables the operator to see when he has drawn the milk out of the receptacle, so as to properly divide the same from the cream.

The apparatus employed in carrying out my improved process is simple, cheap, durable, and not liable to get out of order, and the butter produced from the cream is of the finest grain and quality. The vessel A may be provided with any suitable means of heating it or its contents, as represented by the dotted lines T.

It will be understood that the cheap and practical way of securing the requisite pressure is by the use of atmospheric air, and that no other gases should be used which from their known properties would have an injurious effect on the milk or cream.

I do not claim herein, broadly, the process of hastening the raising of cream by subjecting the milk to a heavy pressure, as such process is covered by my pending application, Serial No. 398,130, filed July 1, 1891.

I claim—

1. The herein-described process of separating cream from milk, consisting in subjecting the milk while tightly confined to pressure greater than the normal atmospheric pressure for a limited period of time, subsequently reducing the pressure on the milk, and then allowing the milk to stand undisturbed, thus completing the process, substantially as and for the purposes set forth.

2. The herein-described process of separating cream from milk, consisting in subjecting the milk while tightly confined to pressure greater than the normal atmospheric pressure for a limited period of time and subsequently reducing the pressure on the milk prior to the rising of the cream, substantially as and for the purposes set forth.

3. The herein-described process of separating cream from milk, consisting in subjecting the milk while tightly confined to air or gaseous pressure above the normal for a limited period of time and subsequently reducing the pressure on the milk, substantially as and for the purposes set forth.

4. The herein-described process of separating cream from milk, consisting in subjecting the milk to air-pressure above the normal for a limited period of time and subsequently reducing the pressure on the milk to the normal before the cream has all risen, substantially as and for the purposes described.

5. The herein-described process of separating cream from milk, consisting in subjecting the milk while tightly confined to an air-pressure of one or more atmospheres above the normal for a limited period of time and subsequently reducing the pressure on the milk before the cream is all up, substantially as and for the purposes set forth.

6. The herein-described process of separating cream from milk, consisting in subjecting the milk while tightly confined to an air-pressure of one or more atmospheres above the normal for a limited period of time and subsequently reducing the pressure on the milk to the normal before the cream has all risen, substantially as and for the purposes set forth.

JOHN J. BERRIGAN.

Witnesses:
 GEO. B. SELDEN,
 C. G. CRANNELL.